United States Patent
Aravamudhan et al.

(10) Patent No.: US 10,581,928 B2
(45) Date of Patent: Mar. 3, 2020

(54) METHODS, SYSTEMS, AND COMPUTER READABLE MEDIA FOR SHARING IDENTIFICATION INFORMATION OF NETWORK NODES IN AN INTERNET PROTOCOL MULTIMEDIA SUBSYSTEM (IMS) NETWORK

(71) Applicant: Oracle International Corporation, Redwood Shores, CA (US)

(72) Inventors: Venkatesh Aravamudhan, Bangalore (IN); Ranganath Ashok Bodhanapati, Bangalore (IN); Raghuvamshi vasudev Singh Thakur, Bangalore (IN); Nitin Gupta, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 193 days.

(21) Appl. No.: 15/494,324

(22) Filed: Apr. 21, 2017

(65) Prior Publication Data

US 2018/0309800 A1 Oct. 25, 2018

(51) Int. Cl.
*H04L 29/06* (2006.01)
*H04L 12/14* (2006.01)
(Continued)

(52) U.S. Cl.
CPC ...... *H04L 65/1069* (2013.01); *H04L 12/1407* (2013.01); *H04L 65/1006* (2013.01);
(Continued)

(58) Field of Classification Search
CPC ............. H04L 65/1069; H04L 12/1407; H04L 65/1006; H04L 65/1016; H04L 65/1073;
(Continued)

(56) References Cited

U.S. PATENT DOCUMENTS 7,844,745 B1   11/2010   Darbyshire et al.
8,918,469 B2   12/2014   Sprague et al.
(Continued)

FOREIGN PATENT DOCUMENTS

CN            101867873 A    10/2010
CN      ZL201280018288.4      4/2017
(Continued)

OTHER PUBLICATIONS

"Digital cellular telecommunications system (Phase 2+) (GSM); Universal Mobile Telecommunications System (UMTS); LTE; Mobile radio interface Layer 3 specification; Core network protocols; Stage 3 (3GPP TS 24.008 version 13.7.0 Release 13)," ETSI TS 124 008 V13.7.0, pp. 1-779 (Dec. 2016).
(Continued)

*Primary Examiner* — Joseph L Greene
(74) *Attorney, Agent, or Firm* — Jenkins, Wilson, Taylor & Hunt, P.A.

(57) ABSTRACT

Methods, systems, and computer readable media for sharing identification information of network nodes in an IMS network are disclosed. One method includes determining, by a packet data network gateway (PGW), policy and charging rules function (PCRF) identification information corresponding to a PCRF node designated to support an IMS-based subscriber session requested by a user equipment device and establishing, by the PGW, a subscriber Gx session with the PCRF node corresponding to the determined PCRF identification information. The method further includes determining, by the PGW, application function (AF) identification information corresponding to an AF server designated to support the IMS-based subscriber session and generating, by the PGW, a create session response message including at least the PCRF identification information and the AF identification information. The method also
(Continued)

includes sending, by the PGW, the create session response message containing the at least the PCRF identification inform.

14 Claims, 4 Drawing Sheets

(51) Int. Cl.
     *H04M 15/00*           (2006.01)
     *H04W 4/24*            (2018.01)
(52) U.S. Cl.
     CPC ...... *H04L 65/1016* (2013.01); *H04L 65/1073* (2013.01); *H04M 15/57* (2013.01); *H04M 15/65* (2013.01); *H04M 15/66* (2013.01); *H04W 4/24* (2013.01)
(58) Field of Classification Search
     CPC ...... H04M 15/57; H04M 15/65; H04M 15/66; H04W 4/24
     USPC ........................................................ 709/227
     See application file for complete search history.

(56) References Cited

U.S. PATENT DOCUMENTS

| | | | |
|---|---|---|---|
| 2006/0068762 | A1 | 3/2006 | Baldwin et al. |
| 2006/0078119 | A1 | 4/2006 | Jee et al. |
| 2009/0196231 | A1 | 8/2009 | Giaretta et al. |
| 2009/0264097 | A1 | 10/2009 | Cai et al. |
| 2009/0305684 | A1 | 12/2009 | Jones et al. |
| 2010/0291923 | A1 | 11/2010 | Zhou et al. |
| 2010/0299451 | A1* | 11/2010 | Yigang ................. H04L 45/306 709/241 |
| 2011/0199906 | A1 | 8/2011 | Kanode et al. |
| 2011/0202614 | A1 | 8/2011 | Craig et al. |
| 2011/0225113 | A1 | 9/2011 | Mann |
| 2012/0096177 | A1 | 4/2012 | Rasanen |
| 2012/0124220 | A1 | 5/2012 | Zhou et al. |
| 2012/0155470 | A1 | 6/2012 | McNamee et al. |
| 2012/0202550 | A1 | 8/2012 | Marsico |
| 2012/0226758 | A1 | 9/2012 | Sprague et al. |
| 2012/0239771 | A1* | 9/2012 | Rasanen ............. H04L 65/1016 709/206 |
| 2016/0127137 | A1* | 5/2016 | Fernandez Alonso ...................... H04L 41/0893 370/259 |
| 2016/0156479 | A1* | 6/2016 | Baek ........................ H04W 4/14 455/406 |

FOREIGN PATENT DOCUMENTS

| | | |
|---|---|---|
| EP | 2 242 205 A1 | 10/2010 |
| EP | 2 220 841 B1 | 9/2011 |
| EP | 2 681 939 B1 | 9/2016 |
| JP | 2013-527999 T | 7/2013 |
| WO | WO 2012/118959 A1 | 9/2012 |

OTHER PUBLICATIONS

"LTE; General Packet Radio Service (GPRS) enhancements for Evolved Universal Terrestrial Radio Access Network (E-UTRAN) access (3GPP TS 23.401 version 12.11.0 Release 12)," ETSI TS 123 401 V12.11.0, pp. 1-311 (Apr. 2016).
"VoLTE Service Description and Implementation Guidelines Version 2.0," GSM Association, Official Document FCM.01—VoLTE Service Description and Implementation Guidelines, pp. 1-175 (Oct. 7, 2014).
"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).
"3rd Generation Partnership Project; Technical Specification Group Core Network and Terminals; Policy and Charging Control signalling fows and Quality of Service (QoS) parameter mapping (Release 9)," 3GPP TS 29.213 V9.2.0, pp. 1-129 (Mar. 2010).
Letter Regarding Decision to Grant for Chinese Application No. ZL201280018288.4 (dated Feb. 14, 2017).
Notification of the Second Office Action for Chinese Patent Application No. 201280018288.4 (dated Sep. 5, 2016).
Decision to grant a European patent pursuant to Article 97(1) EPC for European Patent Applicaton No. 12751986.6 (dated Aug. 19, 2016).
Communication under Rule 71(3) EPC for European Application No. 12 751 986.6 (dated Jun. 8, 2016).
Letter Regarding Notice of Grant for Japanese Patent Application No. 2013-556855 (dated Feb. 2, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Letter Regarding Office Action for Japanese Patent Application No. 2013-556855 (dated Feb. 24, 2015).
Extended European Search Report for European Patent Application No. 12751986.6 (dated Jan. 20, 2015).
Communication of European publication number and information on the application of Article 67(3) EPC for European Application No. 12751986.6 (dated Dec. 11, 2013).
Declaration of Mark Kanode for U.S. Appl. No. 13/409,893, filed Nov. 1, 2013.
Advisory Action Before the Filing of an Appeal Brief for U.S. Appl. No. 13/409,893 (dated Sep. 13, 2013).
Final Office Action for U.S. Appl. No. 13/409,893 (dated Jul. 1, 2013).
Non-Final Office Action for U.S. Appl. No. 13/409,893 (dated Dec. 13, 2012).
Notification of Transmittal of the International Search Report and the Written Opinion of the International Searching Authority, or the Declaration for International Application No. PCT/US2012/027263 (dated Jun. 14, 2012).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0, pp. 1-130 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0, pp. 1-40 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0, pp. 1-76 (Oct. 2010).
"3rd Generation Partnership Project; Technical Specification Group Services and System Aspects; Telecommunication management; Charging management; Diameter charging applications (Release 9)," 3GPP TS 32.299, V9.4.0, pp. 1-148 (Jun. 2010).
"3rd Generation Partnership Project; Technical Specification Group Services and System Aspects; Telecommunication management; Charging management; Charging architecture and principles (Release 9)," 3GPP TS 32.240, V9.1.0, pp. 1-44 (Jun. 2010).
"3rd Generation Partnership Project; Technical Specification Group Core Network and Terminals; Policy and Charging Control over Gx reference point (Release 9)," 3GPP TS 29.212 V9.2.0, pp. 1-11 (Mar. 2010).
Liu et al., "IBM Technical Library, Introduction to Diameter," pp. 1-9, http://www.ibm.com/developerworks/wireless/library/wi-diameter (Jan. 24, 2006).
Hakala et al., "Diameter Credit-Control Application," RFC 4006, pp. 1-114 (Aug. 2005).

(56) References Cited

OTHER PUBLICATIONS

Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt, pp. 1-21 (Aug. 1, 1998).
Berners-Lee et al., "Uniform Resource Identifiers (URI): Generic Syntax," RFC 2396, pp. 1-38 (Aug. 1998).
Jalava, "Service Routing in 3GPP IP Multimedia Subsystem," Nokia, pp. 1-16 (Publication Date Unknown).

\* cited by examiner

METHODS, SYSTEMS, AND COMPUTER READABLE MEDIA FOR SHARING IDENTIFICATION INFORMATION OF NETWORK NODES IN AN INTERNET PROTOCOL MULTIMEDIA SUBSYSTEM (IMS) NETWORK

TECHNICAL FIELD

The subject matter described herein relates to methods and systems for distributing identification information within a communications network. More particularly, the subject matter described herein relates to methods, systems, and computer readable media for sharing identification information of network nodes in an Internet protocol multimedia subsystem (IMS) network.

BACKGROUND

At present, LTE networks require that a single policy and charging rules function (PCRF) network device is assigned responsibility for maintaining mapping information for both a subscriber Gx session and a subscriber Rx session. Notably, the determination of the PCRF is typically performed separately by two different network entities, such as the packet data network (PDN) gateway (PGW) and an Application Function (AF) server (e.g., a proxy call session control function (P-CSCF)). Notably, in order to initiate and establish an LTE session, current standards require the initial establishment of a Gx session, which is largely conducted by a Diameter routing agent (DRA) node. After the successful creation of the subscriber Gx session, subsequent processing requires the aforementioned P-CSCF device to communicate with the previously determined PCRF in order to establish a related Rx session and to communicate an authorization request message (e.g., Rx AA-Request message). Notably, the P-CSCF is currently unaware of the specific PCRF that has been designated to establish the subscriber Gx session. This lack of information thereby compels the P-CSCF to route the authorization request message towards a DRA node, which maintains a record of the appropriate supporting PCRF. After receiving the authorization request message, the DRA node performs the required session binding by determining the correct PCRF and routing the request message to the designated PCRF.

SUMMARY

Methods, systems, and computer readable media for sharing identification information of network nodes in an IMS network are disclosed. In some embodiments, the method includes determining, by a packet data network gateway (PGW), policy and charging rules function (PCRF) identification information corresponding to a PCRF node designated to support an IMS-based subscriber session requested by a user equipment device and establishing, by the PGW, a subscriber Gx session with the PCRF node corresponding to the determined PCRF identification information. The method further includes determining, by the PGW, application function (AF) identification information corresponding to an AF server designated to support the IMS-based subscriber session and generating, by the PGW, a create session response message including at least the PCRF identification information and the AF identification information. The method also includes sending, by the PGW, the create session response message containing the at least the PCRF identification information and the AF node identification information to the user equipment device.

In some embodiments, the system includes a packet data network gateway (PGW) comprising at least one processor, a memory, and a synchronization management engine stored in the memory and when executed by the at least one processor of the PGW is configured to determine policy and charging rules function (PCRF) identification information corresponding to a PCRF node designated to support an IMS-based subscriber session requested by a user equipment device and establish a subscriber Gx session with the PCRF node corresponding to the determined PCRF identification information. The PGW of the system may also be configured to determine application function (AF) identification information corresponding to an AF server designated to support the IMS-based subscriber session, generate a create session response message including at least the PCRF identification information and the AF identification information, and send the create session response message containing the at least the PCRF identification information and the AF node identification information The subject matter described herein can be implemented in software in combination with hardware and/or firmware. For example, the subject matter described herein can be implemented in software executed by a processor. In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms 'node' refers to a physical computing platform including one or more processors and memory.

As used herein, the terms 'engine', 'function' or 'module' refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for discovering network nodes in an Internet protocol multimedia subsystem (IMS) network. As indicated above, a PGW is able to determine a specific PCRF that is responsible for hosting a subscriber Gx session. However, in the event a subscriber Rx session is to be established by an AF server and a PCRF, the AF server is typically unaware of which PCRF is hosting the subscriber GX session. Consequently, the AF server may depend on a Diameter routing agent (DRA) node in the operator network for the pertinent PCRF identification information. Typically, the DRA node assists in the determination of the correct diameter nodes (e.g., a PCRF node or OCS server) due to the dynamic session distribution across policy and charging components. As an example, the DRA node may maintain the subscriber Gx session binding information with the PCRF. Accordingly, the AF server forwards an authorization request message (e.g., AA-Request message) to the DRA node, which subsequently routes the request message to the correct PCRF that is hosting the subscriber Gx session.

In contrast, the disclosed subject matter provides a mechanism to communicate PCRF identification information (and/or OCS server identification information) between a PGW and an AF server (e.g., a P-CSCF node) via a user equipment device. As used herein, identification information may refer to a network element's an Internet protocol (IP) version 4 address, an IP version 6 address, a uniform resource locator (URL), a session initiation protocol (SIP) uniform resource identifier (URI), or the like. In particular, the exchange of network element identification information is conducted without the use of a DRA. Specifically, the disclosed system may perform a session binding process that involves the PGW communicating (via the user equipment) network node identification information to an AF server, which in turn uses the identification information to directly establish one or more subscriber sub-sessions with the identified PCRF and/or OCS server in a manner in which an existing DRA is bypassed and/or avoided. Similarly, the disclosed system and method affords the technical advantage of completely obviating the need for a DRA and can be performed without a DRA deployed within the system.

Reference will now be made in detail to various embodiments of the subject matter described herein, examples of which are illustrated in the accompanying drawings. Wherever possible, the same reference numbers will be used throughout the drawings to refer to the same or like parts.

Figure 1A:
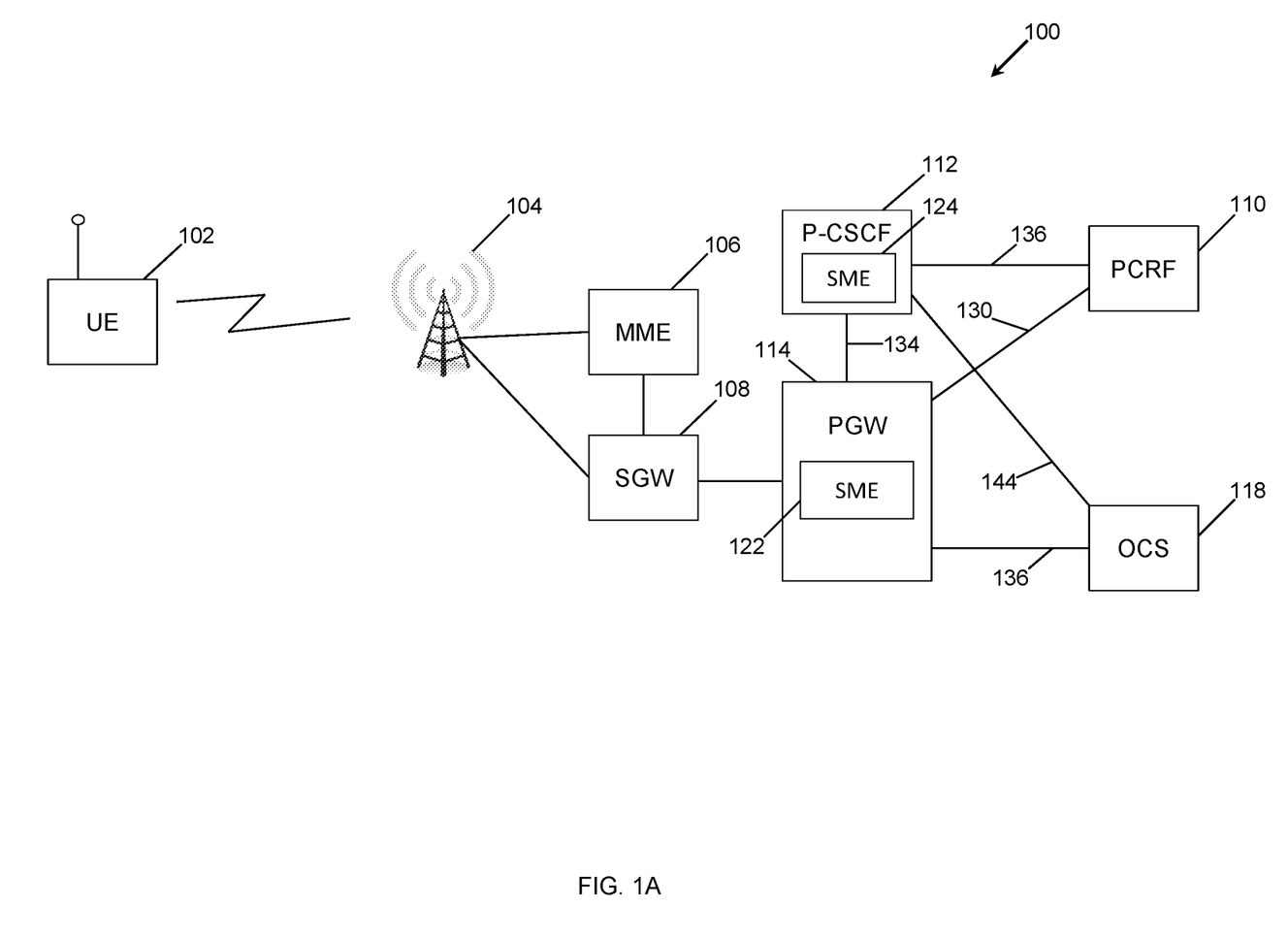
FIGS. 1A and 1B are block diagrams illustrating exemplary systems configured for sharing identification information of network nodes in an IMS network in accordance to an embodiment of the subject matter described herein.

FIG. 1A is a block diagram illustrating an example communications environment 100 for sharing identification information of network nodes in a computer network. In some embodiments, communications environment 100 may include one or more nodes associated with a fourth generation (4G) network, a long term evolution (LTE) network, an Internet protocol (IP) Multimedia Core Network Subsystem (IMS) network, a LTE-advanced network, and/or an evolved packet core (EPC) network. For example, FIG. 1A includes a user equipment (UE) 102, such as a mobile device, a tablet computing platform, a smartphone, or the like, which is capable of wirelessly communicating with an eNodeB 104 via 4G, LTE, or some other wireless access protocol. In some embodiments, user equipment 102 may be configured to wirelessly connect with eNodeB 104 in order to facilitate communication with an external network, such as the Internet and/or an IMS network.

Communications environment 100 may also include various network nodes that compose an evolved packet system (EPS) network, such as a mobility management entity (MME) 106, a serving gateway (SGW) 108, a PDN gateway (PGW) 114, a policy and charging rules function (PCRF) node 110, a online charging services (OCS) server 118, a proxy-call session control function (P-CSCF) node 112, and the like. In some embodiments, communications environment 100 and/or its related nodes may be configured to handle and facilitate multimedia services (e.g., Internet access, VoIP call sessions, VoLTE call sessions, etc.).

In some embodiments, user equipment 102 may communicate with PGW 114 via an access network, which may represent a radio access network (RAN) and may include various nodes for communicating with user equipment 102 and elements within communications environment 100. Example nodes in the access network may include eNodeB 104, which may perform radio access functions. The access network, or nodes therein, may be used for communications between user equipment 102 and nodes in the communications environment 100. For example, eNodeB 104 or some other node (e.g., MME 106, SGW 108, etc.) may communicate UE-related messages (e.g., authentication, attachment requests, mobility related messages, session setup requests, etc.) to various nodes in communications environment 100.

In some embodiments, eNodeB 104 is configured to forward communications (e.g., session setup request messages) received from user equipment 102 to MME 106. MME 106 is the primary control-node for the radio access network (e.g., an LTE access network) and is responsible for assisting with bearer activation/deactivation processing as well as selecting a SGW (e.g., SGW 108) and PGW (e.g., PGW 114) for user equipment 102 at the initial attachment stage. Further, MME 106 is configured to generate create session request messages (that contain IMS access point name (APN) information) in response to receiving corresponding session setup request messages originating from user equipment 102. After generating the creation request message, MME 106 may be configured to direct the message to PGW 114 via SGW 108 (e.g., by way of S11 and S5 (GPRS tunneling protocol (GTP) interfaces). In some embodiments, SGW 108 represents a node or gateway for facilitating communications between the access network/eNodeB and other nodes (e.g., PGW 114) or networks. In some embodiments, SGW 108 may communicate user traffic to other nodes in communications environment 100.

In some examples, PGW 114 may be any suitable entity for providing access to the Internet, an IMS network, and/or other data networks. For example, SGW 108 may communicate with PGW 114 to provide communications with an AF server or other server located in communications environment 100. In some embodiments, PGW 114 may include a policy and charging enforcement function (PCEF) and may manage and enforce policy and charging control (PCC) rules provided by a PCRF. For example, PCC rules may be provided for each service data flow (e.g., one or more packet flows that match certain criteria, such as a subscriber-based media traffic flow) and/or user equipment 102 attempting to use PGW 114. In this example, PGW 114 may control access to external networks and charge for access of nodes in an IMS network based on policy rules received from the PCRF (e.g., via an IP-CAN session).

With regard to the disclosed subject matter, PGW 114 may include a synchronization management engine (SME) 122 that is configured to share and/or distribute identification information of network nodes in an IMS network. In some embodiments, SME 122 may comprise a software component that is stored in memory and executed by a processor of PGW 114. For example, after PGW 114 receives a create session request message from MME 106 via SGW 108, SME 122 may be configured to determine and/or designate the PCRF node responsible for supporting the IMS-based subscriber session requested by user equipment 102. As used herein, the PCRF node (e.g., PCRF 110) may be any suitable entity for creating, selecting, or otherwise determining charging rules and/or other policies (e.g., one or more PCC rules). For example, PCRF 110 may be a stand-alone node, e.g., a policy server or a multimedia policy engine (MPE), or may be co-located or integrated with one or more nodes in communications environment 100, e.g., OCS server 118. Returning to FIG. 1A, SME 122 may determine and/or designate a PCRF based on a DNS query, a local policy, or any other available mechanism used by a PGW. For example, SME 122 may extract and cross-reference an IMS APN included in a received create session request message to query a DNS server in order determine a corresponding IP address of the PCRF to be designated (e.g., PCRF 110). In other embodiments, SME 122 and/or PGW 114 may be configured to select a PCRF based on the user equipment's phone number, ISDN, IP address, and/or the like.

After determining the identification information related to the determined PCRF 110, SME 122 and/or PGW 114 may be configured to establish a subscriber Gx session with PCRF 110. Further, SME 122 may also be configured to determine the identification information related to at least one of an AF server (e.g., a P-CSCF node) and an OCS server that are designated to support the subscriber session. In some embodiments, PGW 114 and/or SME 122 may be configured to determine a P-CSCF by either querying one or more DNS servers that return P-CSCF identification information or utilizing a static configuration based on APN information. Similarly, PGW 114 and/or SME 122 may be configured to determine an OCS server based on one or more parameters including, but not limited to, APN information, charging characteristics (i.e., parameters that help characterize post/pre-paid subscriber), IMSI series information, MSISDN series information, and/or a static configuration.

OCS server 118 may be any suitable entity for performing one or more charging control functions (e.g., online charging). In some embodiments, OCS server 118 may be a stand-alone node, or may be co-located or integrated with one or more nodes in communications environment 100. Similarly, the aforementioned AF server is represented in FIG. 1A as a P-CSCF node 112, which assists with the control signaling plane duties in an IMS network, including conducting SIP registrations and performing various routing functions. Once at least one of the AF identification information, the PCRF identification information, and/or the OCS identification information is obtained by SME 122 and/or PGW 114, SME 122 is configured to generate a signaling message that includes the acquired identification information. For example, SME 122 generates a create session response message that is encoded with protocol configuration option (PCO) information elements (IEs) that contain the AF server identification information (e.g., P-CSCF IP address), the OCS identification information, and the PCRF identification information. Notably, the PCO IEs in GTP messaging in the create session response message enable the SME 122 and/or PGW 114 to pass or provide information to user equipment 102 transparently. Alternatively, PGW 114 may be configured to select and/or use any other GTP based IE for transferring PCRF/OCS identification information transparently towards the user equipment 102. In alternate embodiments, the sending of the PCRF identification information may be transparently sent to user equipment 102 associated with a UMTS/HSPA+ based VoLTE subscriber as part of the GTP messaging sent to a gateway GPRS support node (GGSN) or other packet gateway that is utilized in other Access technologies.

Upon receiving the identification information provided by SME 122, user equipment 102 may be configured to generate a SIP registration message (e.g., SIP REGISTER message) that contains the PCRF identification information and/or the OCS identification information. In particular, the SIP registration message generated by user equipment 102 will be addressed and sent to AF server corresponding to the AF identification information received from SME 122.

After receiving the SIP registration message that includes the PCRF and/or OCS identification information, the AF server (e.g., P-CSCF 112) may utilize a SME 124, which is configured to extract, read, and/or utilize the identification information contained in the SIP registration message to initiate subscriber sub-sessions. In some embodiments, SME 124 may comprise a software component that is stored in memory and executed by a processor of the AF server. For example, referring to FIG. 1A, SME 124 in P-CSCF 112 may extract and/or read PCRF identification information to directly communicate with PCRF 110 and establish a subscriber Gy session that can be used to send and receive AAR and AAA messages. Notably, the P-CSCF 112 and/or SME 124 is able to establish the Gy session without communicating with a DRA (which is absent from environment 100). Similarly, SME 124 may also be configured to extract and/or read OCS identification information to directly communicate with OCS 118 and establish a subscriber Ro session that can be used to send and receive CCR and CCA messages. Notably, the P-CSCF 112 and/or SME 124 is able to establish the Ro session without communicating with a DRA (which is absent from environment 100).

It will be appreciated that FIG. 1A and its related description are for illustrative purposes and that PGW 114 may include additional and/or different modules, components, or functionality. Further, SME 122 and/or related functionality described herein may be associated with different and/or additional nodes or entities. For example, PGW 114 may include SME 12 and/or functionality for sharing identification information of network nodes in an IMS network.

Figure 1B:
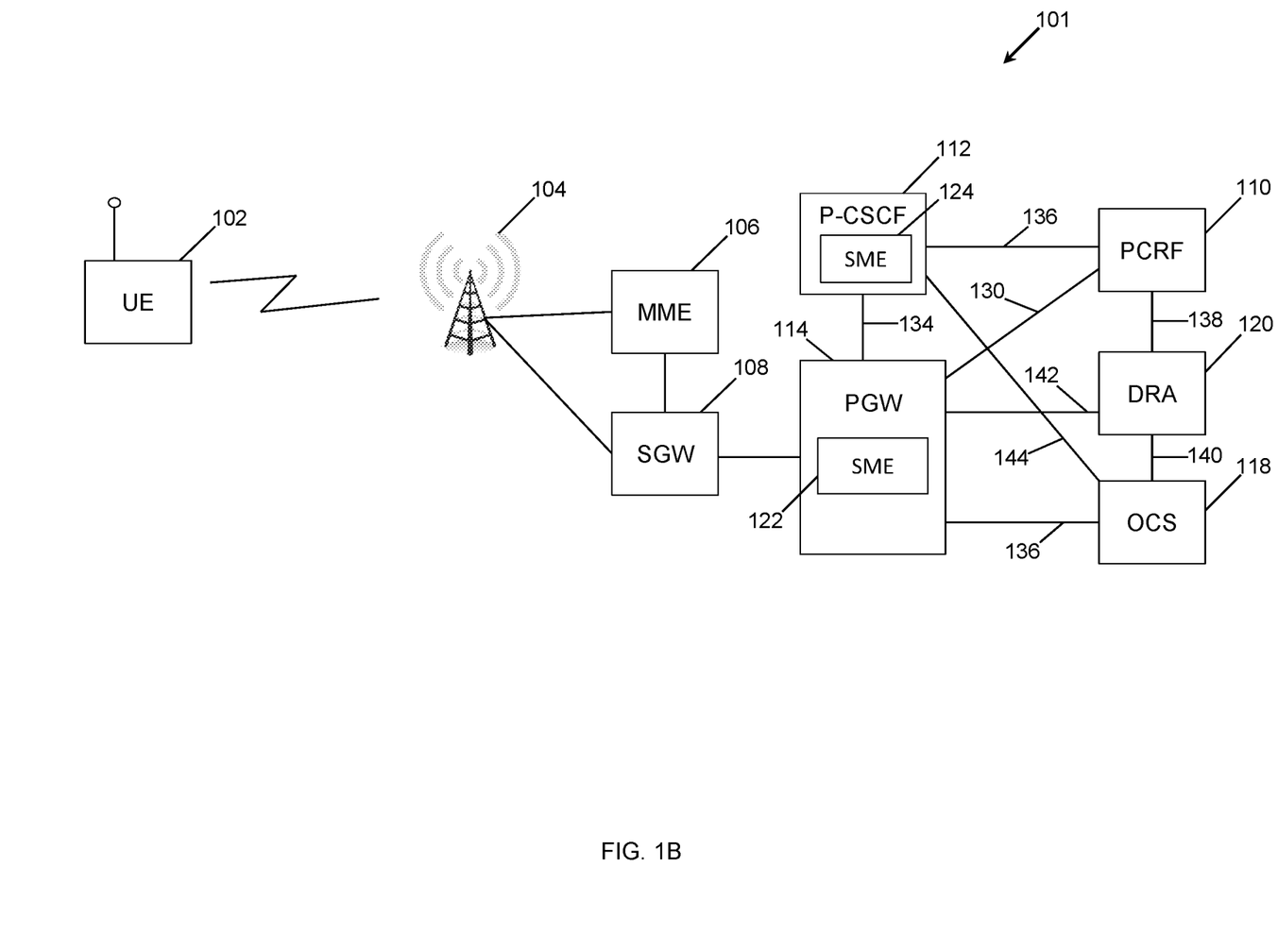

FIG. 1B is a diagram illustrating an example communications environment 101 for sharing identification information of network nodes in an IMS network. In some embodiments, communications environment 101 may include elements that are disclosed in FIG. 1A including user equipment 102, eNodeB 104, MME 106, SGW 108, PGW 114, P-CSCF 112, PCRF 110, and OCS server 118. Notably, however, communications environment 101 in FIG. 1B includes a Diameter Routing Agent (DRA) 120. DRA 120 may be any suitable entity (e.g., one or more computing platforms or devices) for receiving, processing, routing, and/or forwarding Diameter messages. For example, DRA 120 may route and/or forward various Diameter messages between nodes in communications environment 100. However, as will be explained below, DRA 120 is strategically bypassed and not used to provide an AF server (e.g., P-CSCF) identification information pertaining to either PCRF 110 or OCS server 118. Notably, PGW 114 generates a create session response message (as described above with respect to FIG. 1A) including PCO IEs that contain the identification information for PCRF 110, the AF server (i.e., P-CSCF 112), and OCS server 118. The create session response message is sent directly toward user equipment 102 without the processing or use of DRA 120 (i.e., connections 138, 140, and 142 are not utilized). After receiving the identification information, user equipment 102 may generate and send a SIP registration message to P-CSCF 112 in the same manner described above with respect to FIG. 1A.

After receiving the SIP registration message that includes the PCRF and/or OCS identification information, P-CSCF 112 may utilize SME 124, which is configured to extract, read, and/or utilize the identification information contained in the SIP registration message to initiate subscriber sub-sessions. For example, referring to FIG. 1B, SME 124 in P-CSCF 112 may extract and/or read PCRF identification information to directly communicate with PCRF 110 without having to contact and/or obtain PCRF binding information that is stored by DRA 120. Instead, SME 124 may directly establish a subscriber Gy session with PCRF 110 that can be used to send and receive AAR and AAA messages. Notably, P-CSCF 112 and/or SME 124 is able to establish the Gy session without communicating DRA 120. Similarly, SME 124 may also be configured to extract and/or read OCS identification information to directly communicate with OCS 118 and establish a subscriber Ro session that can be used to send and receive CCR and CCA messages. Notably, the P-CSCF 112 and/or SME 124 is able to establish the Ro session without communicating with DRA 120.

Figure 2:
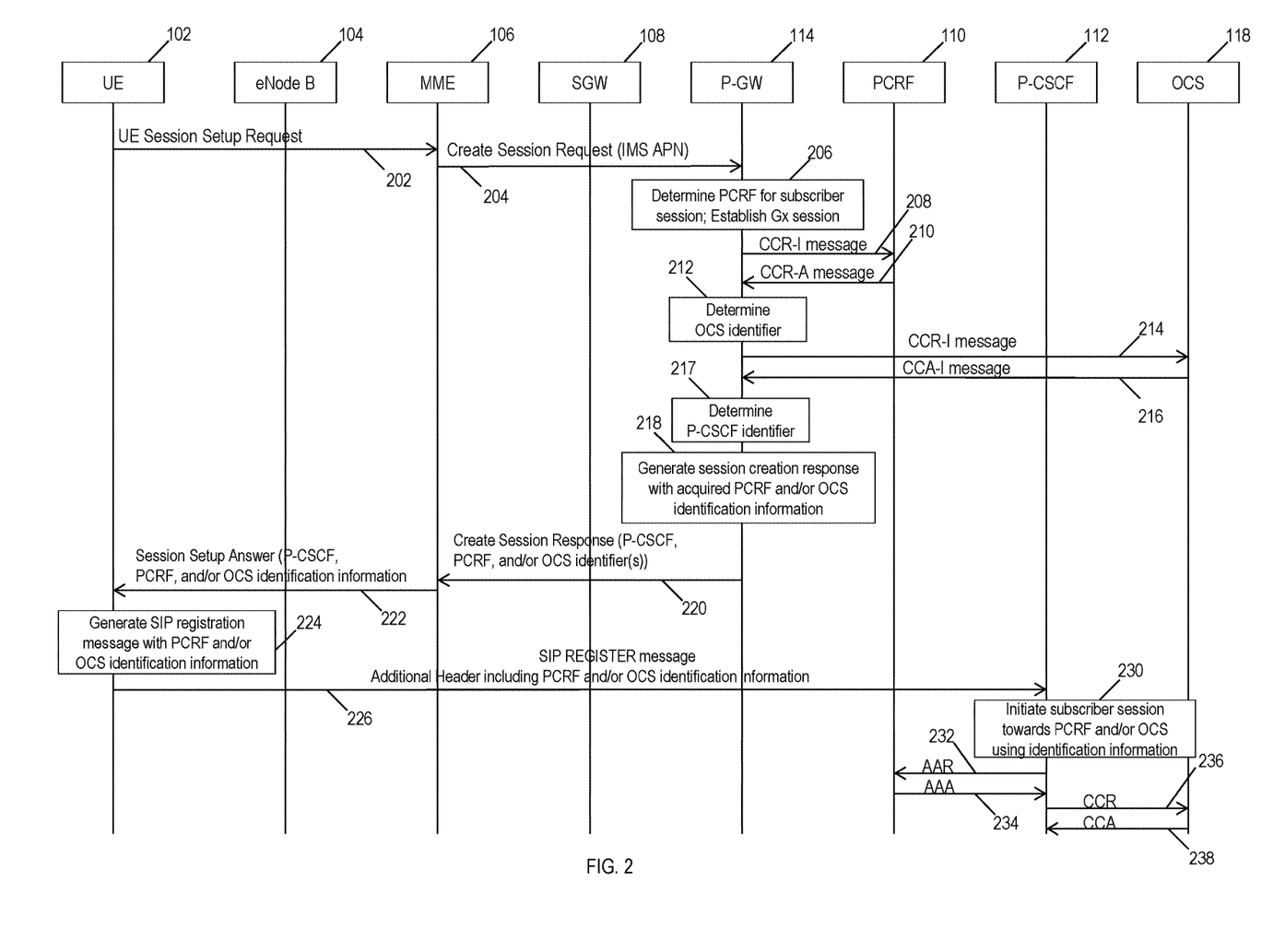
FIG. 2 is a diagram illustrating a signaling diagram related to the sharing of identification information of network nodes in an IMS network in accordance to an embodiment of the subject matter described herein.

FIG. 2 is a diagram illustrating a signaling diagram related to the sharing of identification information of network nodes in an IMS network in accordance to an embodiment of the subject matter described herein. For example, a PGW may generate and subsequently send create session response messages containing PCRF and OCS identification information to a designated P-CSCF via a user equipment 102. Such a mechanism and/or method enables the P-CSCF to communicate directly with the PCRF 110 and/or OCS 118 in a manner that bypasses (or obviates the use of) a DRA. Notably, the disclosed subject matter enables the P-CSCF to establish subscriber Rx sessions that are session bound to the same PCRF that is responsible for supporting the previously established subscriber Gx session.

Referring to FIG. 2, PGW 114 may include functionality for processing various messages. PGW 114 may include one or more communications interface(s) for communication with Diameter protocol entities, e.g., 3rd Generation Partnership Project (3GPP) LTE communications interfaces and other (e.g., non-LTE) communications interfaces. For example, the communications interface(s) may receive or send Diameter signaling messages associated with multiple different Diameter signaling interfaces including, but not limited to, Gx, Gxx, Rx, Sd, Sy, Gy, Ro, and/or S9.

In FIG. 2, user equipment 102 sends a session setup request message 202 to an MME 106 via eNodeB 104 in order to request the establishment of an IMS-based subscriber session that may be used to conduct a voice over LTE (VoLTE) call session. User equipment 102 may facilitate the communication by establishing a radio access session with eNodeB 104 using any wireless protocol, such as LTE. The eNodeB 104 may in turn forward session setup request message 202 to MME 106 via an S1-AP interface link.

After receiving session setup request message 202, MME 106 utilizes IMS APN information contained within the message to generate and send a corresponding create session request message 204. In some embodiments, session request message 204 may include identification information that identifies the user equipment's IMS APN and is directed to PGW 114 via SGW 108 by way of S11 and S5 (GTP) interfaces.

After receiving session request message 204, PGW 114 determines and designates an appropriate PCRF that is to be responsible for supporting the IMS-based subscriber session (block 206). In some examples, PGW 114 may determine and/or designate the appropriate PCRF based on a DNS query, a local policy, or any other available mechanism used by a PGW. For example, PGW 114 may extract and cross-reference the IMS APN included in received session request message 204 to query a DNS server in order determine a corresponding IP address of the PCRF to be designated. In other embodiments, PGW 114 may be configured to select a PCRF based on the user equipment's phone number, ISDN, IP address, and/or the like. In block 206, PGW 114 also establishes a subscriber Gx session with the identified PCRF.

In some embodiments, PGW 114 is further configured to send a CCR request message 208 to PCRF 110, which was determined in block 206. PCRF 110 responds to CCR request message 208 sent by PGW 114 with a CCR answer message 210 that includes subscriber-related credit information via the subscriber Gx session.

In some alternate embodiments, PGW 114 may also be configured to determine and/or designate an appropriate OCS server that is responsible for supporting the IMS-based subscriber session. For example, block 212 in FIG. 2 illustrates that PGW 114 is configured for determining the OCS identification information that identifies the aforementioned determined/designated OCS server (e.g., OCS server 118). After making the OCS determination, PGW 114 may send a CCR request message 214 to OCS server 118. In response, OCS 118 replies with a CCA answer message 216 that includes charging and/or account information corresponding to the subscriber account associated with user equipment 102.

In block 217, PGW 114 is configured to determine the identification information corresponding to the application function that provides the subscriber service requested by the user equipment. For example, if the user equipment 102 initially requested the need to setup a VoLTE call session, PGW 114 may determine and/or designate a P-CSCF that is available to support and facilitate a VoLTE call session for user equipment 102.

After PGW 114 has determined the appropriate network element identification information corresponding to the AF/P-CSCF node, PCRF node, and/or OCS server (e.g., the P-CSCF identification information, PCRF identification information and/or OCS identification information) that are responsible for supporting the requested IMS-based subscriber session, PGW 114 generates a create session response message 220 that is encoded with a protocol configuration option (PCO) information element (IE) that contains the AF server identification information (e.g., P-CSCF IP address). Notably, create session response message 220 is generated by PGW 114 to also include/contain the aforementioned acquired PCRF identification information (e.g., PCRF IP address) and/or the OCS identification information (e.g., OCS server IP address). After generating create session response message 220, PGW 114 directs the message to user equipment 102 via MME 106 and SGW 108.

In response to receiving create session response message 220 from PGW 114 via SGW 108, MME 106 generates an associated session setup answer message 222. In some examples, session setup answer message 222 is encoded by MME 116 to include the protocol configuration option (PCO) information element (IE) comprising the P-CSCF identification information, the PCRF identification information, and/or the OCS identification information that were originally included in create session response message 220. MME 116 subsequently sends session setup answer message 222 containing the identification information to user equipment 102.

After receiving session setup answer message 222, user equipment 102 initiates the SIP registration process that will initiate and establish the desired VoLTE call session. In some embodiments, user equipment 102 generates a SIP registration message 226 (e.g., SIP REGISTER message) that is addressed to P-CSCF 112 (or other AF server) and includes the supporting PCRF identification information and/or the OCS identification information that was originally provided by PGW 114 via create session response message 220 and session setup answer message 222 (see block 224). In particular, user equipment 102 uses the AF/P-CSCF identification information to address and send the SIP registration message containing the PCRF identification information and/or OCS identification information directly to P-CSCF node 112.

Upon receiving SIP registration message 226, P-CSCF 112 may be configured to extract the PCRF and/or OCS identification information from SIP registration message 226. For example, after obtaining PCRF identification information from SIP registration message 226, P-CSCF 112 attempt to establish and bind a subscriber Gy session with PCRF 110, which is identified by the received PCRF identification information. Notably, PCRF 110 is the same PCRF that is supporting the subscriber Gx session with PGW 114. Moreover, P-CSCF 112 is able to initiate communication with PCRF 110 in a manner that bypasses or obviates the use of a DRA. P-CSCF 112 and PCRF 110 may subsequently communicate AAR message(s) 232 and AAA message(s) 234 over the subscriber Gy session. Similarly, after obtaining OCS identification information from SIP registration message 226, P-CSCF 112 directly communicate with and attempt to establish a subscriber Ro session with OCS server 118, which is identified by the acquired OCS identification information. P-CSCF 112 and OCS 118 may subsequently communicate CCR message(s) 236 and CCA message(s) 238 over the subscriber Ro session. Notably, P-CSCF 112 initiates communication with OCS server 118 in a manner that bypasses or obviates the use of a DRA.

After the subscriber Ro session and/or the subscriber Gy session are established, PGW 114 may be configured to trigger a dedicated bearer establishment for IMS based media (e.g., voice and video data) towards user equipment 102. After the IMS bearers are successfully created, the subscriber's user equipment 102 can utilize the VoLTE call services to establish a communications service with a destination endpoint.

Figure 3:
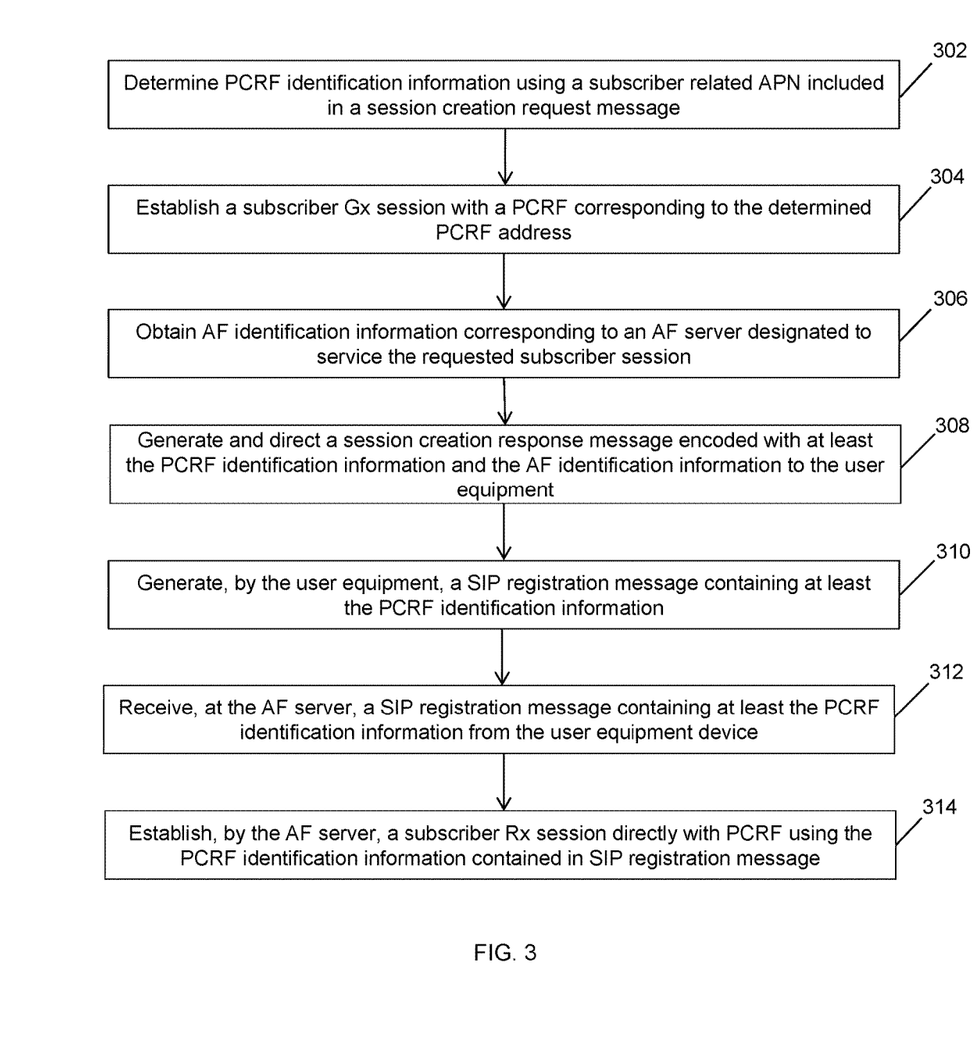
FIG. 3 is a flow diagram depicting an example process for sharing identification information of network nodes in an IMS network in accordance to an embodiment of the subject matter described herein.

FIG. 3 is a flow diagram depicting an example method for sharing identification information of network nodes in an IMS network in accordance to an embodiment of the subject matter described herein. In some embodiments, example process 300 described herein, or portions thereof, may be performed at or performed by PGW 114, SME 122, P-CSCF 112, a Diameter node, and/or another module or node. For example, process 300 may be an algorithm that is stored in memory and executed by a processor within any one of these aforementioned network components.

In some embodiments, a PGW may first be contacted to assist with facilitating the attachment of a user equipment to a packet network. For example, a user equipment device may communicate a session setup request message (i.e., an attach request message) via an eNodeB to an MME, which in turn determines the appropriate SGW and PGW to establish the subscriber session. The MME subsequently generates and directs a create session request message to the designated PGW. In particular, process 300 as illustrated in FIG. 3 depicts exemplary steps conducted by a PGW to share network node identification information in response to the receipt of the create session request message from the MME. For example, referring to process 300, in step 302, the serving PGW may be configured to determine a PCRF identification information (e.g., IP address) after receiving the create session request message. In some examples, the PGW may utilize a subscriber related APN identifier that is included in the Create Session Request message received from the MME to determine the PCRF (and the corresponding PCRF identification information) that is designated to support the subscriber session.

In step 304, a subscriber Gx session is established with the PCRF. In some embodiments, the PGW utilizes the PCRF identification information determined in step 302 to identify the PCRF with which the subscriber Gx session is to be established. After the subscriber Gx session is established between the PGW and the PCRF, the PGW and the PCRF may communicate CCR and CCA messages related to the subscriber's user equipment over the established subscriber Gx session.

In step 306, identification information corresponding to an AF server that is designated to support the requested subscriber session is obtained. In some embodiments, the PGW is configured to determine identification information, such as an IP address, for the AF server designated to support the session or service requested by the user device (e.g., as originally indicated in the session setup request message). In some embodiments, the AF server may include a P-CSCF node that is capable of supporting a VoLTE session requested by the subscriber's user equipment. In some alternate embodiments, the PGW may also be configured to determine an online charging system (OCS) server, or offline charging system server, that can be used to help establish and/or support the session requested by the user equipment. For example, the PGW may determine identification information (e.g., an IP address) of an OCS server that can be used by the PGW to establish a subscriber Gy session with the OCS server. Once the subscriber Gy session is established, the PGW and the OCS may communicate CCR and CCA messages related to the subscriber's user equipment over the established Gy session.

In step 308, a create session response message is generated. In some embodiments, the PGW is configured to generate the create session response message that includes at least the AF identification information (e.g., the P-CSCF identification information) and the PCRF identification information determined in steps 302 and 306. In some embodiments, the PGW may configure a create session response message to include PCO IEs that contain an AF server IP address and a PCRF node IP address previously obtained/determined by the PGW. In some alternate embodiments, the PGW may also be further configured to generate the create session response message to include OCS identification information (e.g., an OCS server IP address obtained in step 306) in the PCO IEs along with the PCRF identification information and the AF node identification information. Ultimately, the PGW sends/directs the create session response message containing the aforementioned identification information (i.e., the PCRF identification information, the AF identification information, and/or the OCS identification information) toward the user equipment via the SGW, MME, and eNodeB. In some embodiments, the MME extracts the identification information from the received create session response message, subsequently generates a session setup answer message including this identification information, and sends the generated answer message to the user equipment.

In step 310, the user equipment device generates a SIP registration message. After receiving the identification information (i.e., the PCRF identification information, the AF identification information, and/or the OCS identification information) from the PGW via the MME, the user equipment generates a SIP registration message to establish the VoLTE session over the attached subscriber session. In some embodiments, the user equipment is configured to create a SIP registration message (e.g., SIP REGISTER message) that includes the PCRF identification information and/or the OCS identification information contained in the PCO IEs received from the PGW. After creating the SIP registration message, the user equipment is configured to utilize the AF server identification information (e.g., P-CSCF node IP address) contained in the received session setup answer message to direct/send the generated SIP registration message to the associated AF server (e.g., the P-CSCF node).

In step 312, a SIP registration message containing at least the PCRF identification information is received by the AF node. In some embodiments, the AF server (e.g., a P-CSCF node) receives the SIP registration message sent to the AF server IP address by the user equipment. Notably, the received SIP registration message includes the PCRF identification information and/or the OCS identification information that was originally obtained by the PGW in steps 302 and 306.

In step 314, a subscriber Rx session is established directly with the PCRF. In some embodiments, the AF node (e.g., the P-CSCF) extracts the PCRF identification information from the received SIP registration message and utilizes the extracted PCRF identification information to initiate a subscriber Rx session with the identified PCRF directly. Notably, the AF server communicates directly with the PCRF in such a manner that bypasses a Diameter routing agent that is typically responsible for maintaining mapping information that binds subscriber sessions and/or responsible for providing the PCRF identification information to the AF server. Alternatively, the AF server may utilize the extracted PCRF identification information to directly communicate with the PCRF in a system that does not include the presence or deployment of a Diameter routing agent. After establishing a direct communication and associated subscriber Rx session with the PCRF, the AF server may begin communicating AAR messages to the PCRF and receiving AAA messages from the PCRF.

In addition, the AF node may also be configured to extract the OCS identification information from the received SIP registration message and utilizes the extracted OCS identification information to initiate a subscriber Ro session with the identified OCS server directly. For example, the AF node may communicate directly with the OCS in such a manner that bypasses the Diameter routing agent that is responsible for providing the OCS identification information to the AF server. Alternatively, the AF server may utilize the extracted OCS identification information to directly communicate with the OCS in a system that does not include the presence or deployment of a Diameter routing agent. After establishing a direct communication and associated subscriber Ro session with the OCS server, the AF node may begin communicating CCR messages to the OCS server and receiving CCA messages from the OCS server.

In some embodiments, the disclosed subject matter comprises generating, by the user equipment device, a SIP registration message that includes at least the PCRF identification information.

In some embodiments, the disclosed subject matter comprises comprising sending, by the user equipment device directly to the AF server, the session initiation protocol (SIP) registration message including the at least the PCRF identification information.

In some embodiments, the disclosed subject matter comprises utilizing, by the AF server, the at least the PCRF identification information contained in the SIP registration message to directly communicate with the PCRF node and to establish a subscriber Rx session with the PCRF node.

In some embodiments, the AF server of the disclosed subject matter communicates with the PCRF node to establish the subscriber Rx session in a manner that bypasses a Diameter routing agent (DRA).

In some embodiments, the create session response message of the disclosed subject matter comprises further includes online charging system (OCS) identification information.

In some embodiments, the SIP registration message of the disclosed subject matter is addressed to the AF server using the AF identification information and contains both the PCRF identification information and the OCS identification information included within the create session response message received from the PGW.

In some embodiments, the AF server of the disclosed subject matter utilizes the OCS identification information to communicate directly with an OCS server and establishes a Ro session with the OCS server in a manner that bypasses a Diameter routing agent (DRA).

It should be noted that PGW 114, SME 122, P-CSCF 112, SME 124, and/or functionality described herein may constitute a special purpose computing device. Further, PGW 114, SME 122, P-CSCF 112, SME 1242, and/or functionality described herein can improve the technological field of network communications and subscriber sub-session binding and synchronization. For example, the disclosed subject matter affords the technical advantage of bypassing a DRA node or obviating the need for a DRA node that is responsible for providing PCRF identification information and/or OCS server identification information for session binding purposes. By eliminating the need to use or deploy a DRA node in a network the disclosed subject matter affords the technical advantages of reducing unnecessary latency and communication hops associated with determining the identity of a bound subscriber session node (e.g., PCRF). The disclosed subject matter similarly provides capital expenditure saving benefits (e.g., removal of Diameter agents for session binding and their associated hardware, software, and licensing costs). Lastly, the disclosed subject matter also provides operational expenditure saving benefits associated with reduced node maintenance, power consumption, installation space, cooling, and the like.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for sharing network node identification information, comprising: determining, by a packet data network gateway (PGW), policy and charging rules function (PCRF) identification information corresponding to a PCRF node designated to support an IMS-based subscriber session requested by a user equipment device, wherein the PCRF identification information includes a PCRF Internet protocol (IP) address of the PCRF node; establishing, by the PGW, a subscriber Gx session with the PCRF node corresponding to the determined PCRF identification information; determining, by the PGW, application function (AF) identification information corresponding to an AF server designated to support the IMS-based subscriber session; generating, by the PGW, a create session response message including at least the PCRF identification information and the AF identification information; sending, by the PGW, the create session response message containing at least the PCRF identification information and the AF identification information to the user equipment device; generating, by the user equipment device, a session initiation protocol (SIP) registration message that includes at least the PCRF identification information; and sending, by the user equipment device directly to the AF server, the SIP registration message including at least the PCRF identification information.

2. The method of claim 1 comprising utilizing, by the AF server, at least the PCRF identification information contained in the SIP registration message to directly communicate with the PCRF node and to establish a subscriber Rx session with the PCRF node.

3. The method of claim 2 wherein the AF server communicates with the PCRF node to establish the subscriber Rx session in a manner that bypasses a Diameter routing agent (DRA).

4. The method of claim 1 wherein the create session response message further includes online charging system (OCS) identification information.

5. The method of claim 4 wherein the SIP registration message is addressed to the AF server using the AF identification information and contains both the PCRF identification information and the OCS identification information included within the create session response message received from the PGW.

6. The method of claim 5 wherein the AF server utilizes the OCS identification information to communicate directly with an OCS server and establishes a Ro session with the OCS server in a manner that bypasses a Diameter routing agent (DRA).

7. A system for sharing network node identification information, comprising: a packet data network gateway (PGW) comprising at least one processor, a memory, and a synchronization management engine stored in the memory and when executed by the at least one processor of the PGW is configured to: determine policy and charging rules function (PCRF) identification information corresponding to a PCRF node designated to support an IMS-based subscriber session requested by a user equipment device, wherein the PCRF identification information includes a PCRF Internet protocol (IP) address of the PCRF node; establish a subscriber Gx session with the PCRF node corresponding to the determined PCRF identification information; determine application function (AF) identification information corresponding to an AF server designated to support the IMS-based subscriber session; generate a create session response message including at least the PCRF identification information and the AF identification information; and send the create session response message containing at least the PCRF identification information and the AF identification information, wherein the user equipment device is configured to generate a session initiation protocol (SIP) registration message that includes at least the PCRF identification information and wherein the user equipment device is further configured to directly send the SIP registration message including at least the PCRF identification information to the AF server.

8. The system of claim 7 wherein the AF server is configured to utilize at least the PCRF identification information contained in the SIP registration message to directly communicate with the PCRF node and to establish a subscriber Rx session with the PCRF node.

9. The system of claim 7 wherein the create session response message further includes online charging system (OCS) identification information.

10. The system of claim 9 wherein the SIP registration message is addressed to the AF server using the AF identification information and contains both the PCRF identification information and the OCS identification information included within the create session response message received from the PGW.

11. A non-transitory computer readable medium comprising computer executable instructions embodied in the non-transitory computer readable medium that when executed by at least one processor of at least one computer cause the at least one computer to perform steps comprising: at a Diameter node: determining, by a packet data network gateway (PGW), policy and charging rules function (PCRF) identification information corresponding to a PCRF node designated to support an IMS-based subscriber session requested by a user equipment device, wherein the PCRF identification information includes a PCRF Internet protocol (IP) address of the PCRF node; establishing, by the PGW, a subscriber Gx session with the PCRF node corresponding to the determined PCRF identification information; determining, by the PGW, application function (AF) identification information corresponding to an AF server designated to support the IMS-based subscriber session; generating, by the PGW, a create session response message including at least the PCRF identification information and the AF identification information; and sending, by the PGW, the create session response message containing at least the PCRF identification information and the AF identification information to the user equipment device; at the user equipment device: generating, by the user equipment device, a session initiation protocol (SIP) registration message that includes at least the PCRF identification information; and sending, by the user equipment device directly to the AF server, the SIP registration message including at least the PCRF identification information.

12. The non-transitory computer readable medium of claim 11 comprising utilizing, by the AF server, at least the PCRF identification information contained in the SIP registration message to directly communicate with the PCRF node and to establish a subscriber Rx session with the PCRF node.

13. The non-transitory computer readable medium of claim 11, wherein the create session response message further includes online charging system (OCS) identification information.

14. The non-transitory computer readable medium of claim 13 wherein the SIP registration message is addressed to the AF server using the AF identification information and contains both the PCRF identification information and the OCS identification information included within the create session response message received from the PGW.

* * * * *